(12) United States Patent
Chen

(10) Patent No.: US 6,570,616 B1
(45) Date of Patent: May 27, 2003

(54) IMAGE PROCESSING METHOD AND DEVICE AND RECORDING MEDIUM IN WHICH IMAGE PROCESSING PROGRAM IS RECORDED

(75) Inventor: Zhe-Hong Chen, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/174,093

(22) Filed: Oct. 16, 1998

(30) Foreign Application Priority Data

Oct. 17, 1997 (JP) .............................................. 9-285536

(51) Int. Cl.[7] .............................. H04N 3/14; H04N 9/68; H04N 9/04; H04N 9/083; G06K 9/56
(52) U.S. Cl. ........................ 348/272; 348/237; 382/205
(58) Field of Search ......................... 358/513; 348/280, 348/272, 237, 252; 382/199, 205, 200

(56) References Cited

U.S. PATENT DOCUMENTS

| 4,630,307 A | * | 12/1986 | Cok | ............................ 382/165 |
| 5,040,064 A |   | 8/1991  | Cok | ............................ 358/163 |
| 5,053,861 A |   | 10/1991 | Tsai et al. | ...................... 358/13 |
| 5,233,670 A | * | 8/1993  | Dufour et al. | ............... 382/205 |
| 5,373,322 A |   | 12/1994 | Laroche et al. | ............. 348/273 |
| 5,382,976 A | * | 1/1995  | Hibbard | ....................... 348/273 |
| 5,652,621 A | * | 7/1997  | Adams, Jr. et al. | ......... 348/272 |

FOREIGN PATENT DOCUMENTS

JP      A-6-339145      12/1994      ............ H04N/9/07

* cited by examiner

*Primary Examiner*—Andrew Christensen
*Assistant Examiner*—Tia M Harris
(74) *Attorney, Agent, or Firm*—Oliff & Berridge, PLC

(57) ABSTRACT

When processing an image of a two-dimensional pixel arrangement such as a Bayer arrangement, when a pixel G (j, i) of a first color component which represents luminance is interpolated, the value of the first color component associated with the primary reference pixels located adjacent to the top and bottom or left and right of the interpolated pixel position, and secondary reference pixels of the first color component, located in the vicinity of the primary reference pixel, is checked. The existence of an image edge component is detected. When an image edge component is detected, the weight of the reference pixels, for example, G(j−1, i), G(j+1, i), G(j, i−1) and G(j, i+1) is changed at the top, bottom, left and right.

14 Claims, 18 Drawing Sheets

FIG.4A GREEN (G) COMPONENT

PIXEL DATA OF COLOR COMPONENT BEFORE INTERPOLATION (5 × 5 PIXEL AREA)

☐ : MISSING PIXELS

FIG.4B RED (R) COMPONENT

PIXEL DATA OF COLOR COMPONENT BEFORE INTERPOLATION (5 × 5 PIXEL AREA)

☐ : MISSING PIXELS

FIG.4C BLUE (B) COMPONENT

PIXEL DATA OF COLOR COMPONENT BEFORE INTERPOLATION (5 × 5 PIXEL AREA)

☐ : MISSING PIXELS

FIG.5A G COLOR COMPONENT
G: INTERPOLATED G COLOR PIXEL

FIG.5B R COLOR COMPONENT
Ri: INTERPOLATED R COLOR PIXEL

FIG.5C B COLOR COMPONENT
Bi: INTERPOLATED B COLOR PIXEL

| | 1 | 2 | 3 | 4 | 5 | 6 |
|---|---|---|---|---|---|---|
| 1 | R11 | G12 | R13 | G14 | R15 | G16 |
| 2 | G21 | B22 | G23 | B24 | G25 | B26 |
| 3 | R31 | G32 | R33 | G34 | R35 | G36 |
| 4 | G41 | B42 | G43 | B44 | G45 | B46 |
| 5 | R51 | G52 | R53 | G54 | R55 | G56 |

PIXEL POSITION IN THE HORIZONTAL DIRECTION (ROWS)

PIXEL POSITION IN THE VERTICAL DIRECTION (COLUMNS)

INTERPOLATION OF R COLOR, B COLOR

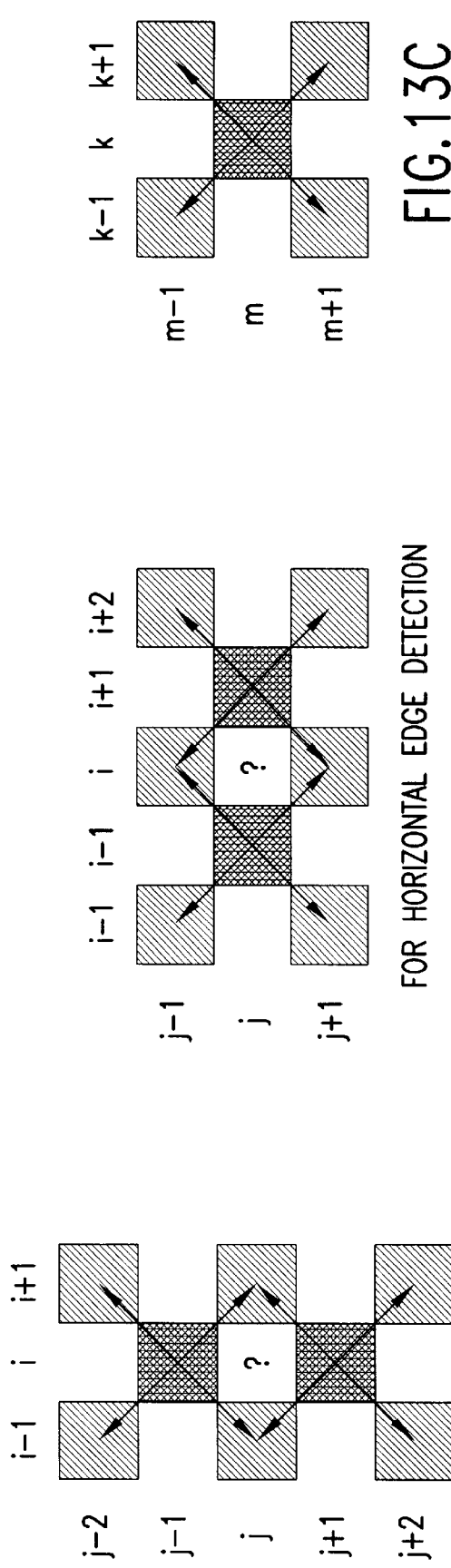
FIG. 13C
FIG. 13B
FOR HORIZONTAL EDGE DETECTION
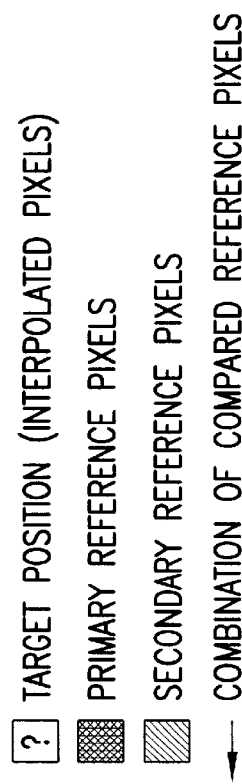
FIG. 13A
FOR VERTICAL EDGE DETECTION
☐ TARGET POSITION (INTERPOLATED PIXELS)
▨ PRIMARY REFERENCE PIXELS
▨ SECONDARY REFERENCE PIXELS
— COMBINATION OF COMPARED REFERENCE PIXELS ▨ PRIMARY REFERENCE PIXELS
▨ SECONDARY REFERENCE PIXELS
← COMBINATION OF COMPARED REFERENCE PIXELS

SECOND EMBODIMENT (WHEN THERE ARE THREE COMPARED PIXELS)

SECOND EMBODIMENT (WHEN THERE ARE THREE COMPARED PIXELS)

SECOND EMBODIMENT (WHEN THERE ARE THREE COMPARED PIXELS)

SECOND EMBODIMENT (WHEN THERE ARE THREE COMPARED PIXELS)

▨ PRIMARY REFERENCE PIXELS
▨ SECONDARY REFERENCE PIXELS
← COMBINATION OF COMPARED REFERENCE PIXELS

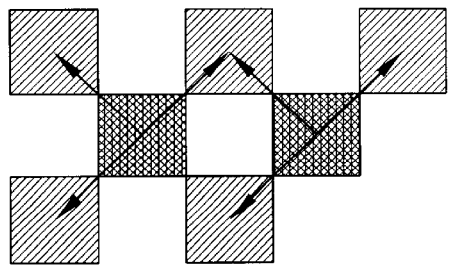

COMBINATION OF REFERENCE PIXELS WHEN THE HORIZONTAL DIRECTION EDGE IS DETECTED

FIG.14E

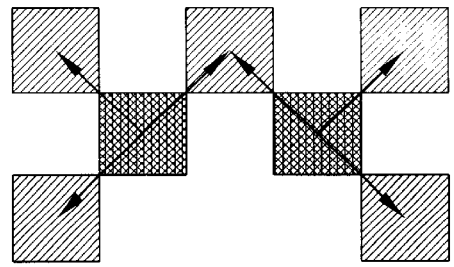

COMBINATION OF REFERENCE PIXELS WHEN THE HORIZONTAL DIRECTION EDGE IS DETECTED

FIG.14F

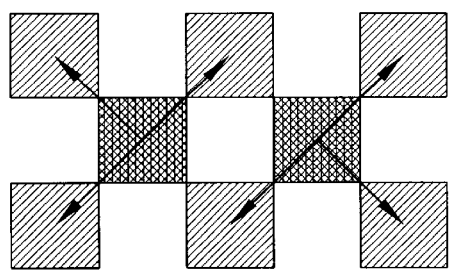

COMBINATION OF REFERENCE PIXELS WHEN THE HORIZONTAL DIRECTION EDGE IS DETECTED

FIG.14G

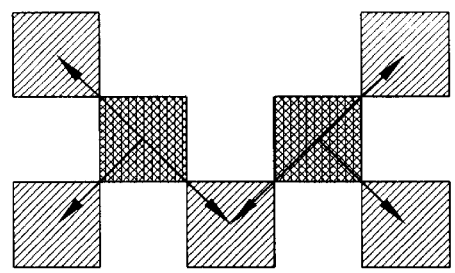

COMBINATION OF REFERENCE PIXELS WHEN THE HORIZONTAL DIRECTION EDGE IS DETECTED

FIG.14H

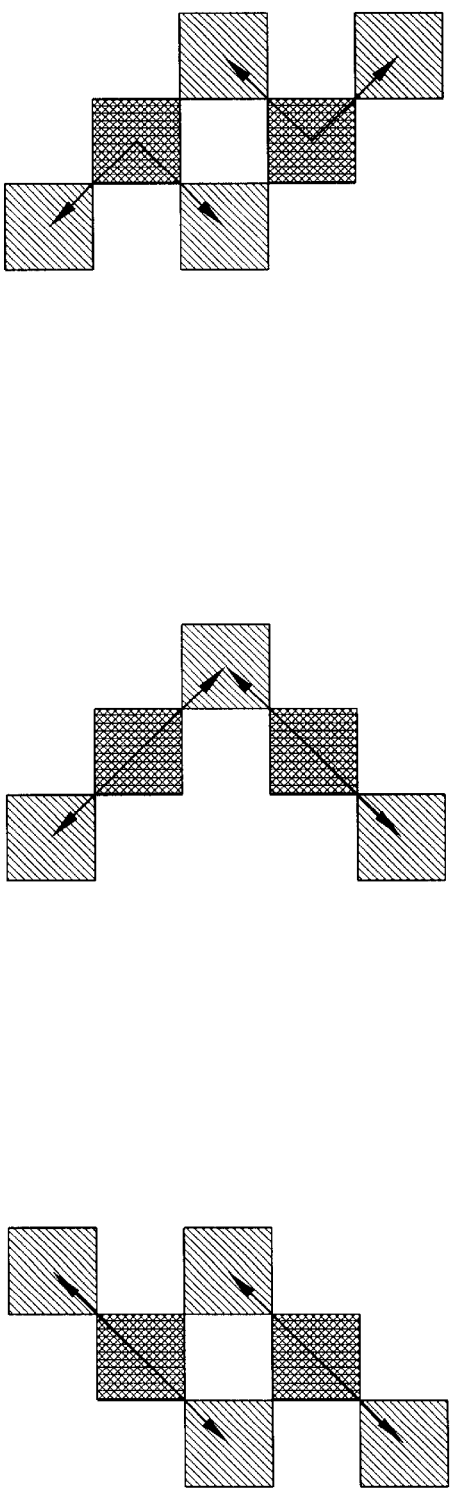

- ▨ PRIMARY REFERENCE PIXELS
- ▧ SECONDARY REFERENCE PIXELS
- → COMBINATION OF COMPARED REFERENCE PIXELS

FIG.15A
THIRD EMBODIMENT (WHEN THERE ARE TWO COMPARED PIXELS) COMBINATION OF REFERENCE PIXELS WHEN THE VERTICAL DIRECTION EDGE IS DETECTED

FIG.15B
THIRD EMBODIMENT (WHEN THERE ARE TWO COMPARED PIXELS) COMBINATION OF REFERENCE PIXELS WHEN THE VERTICAL DIRECTION EDGE IS DETECTED

FIG.15C
THIRD EMBODIMENT (WHEN THERE ARE TWO COMPARED PIXELS) COMBINATION OF REFERENCE PIXELS WHEN THE VERTICAL DIRECTION EDGE IS DETECTED

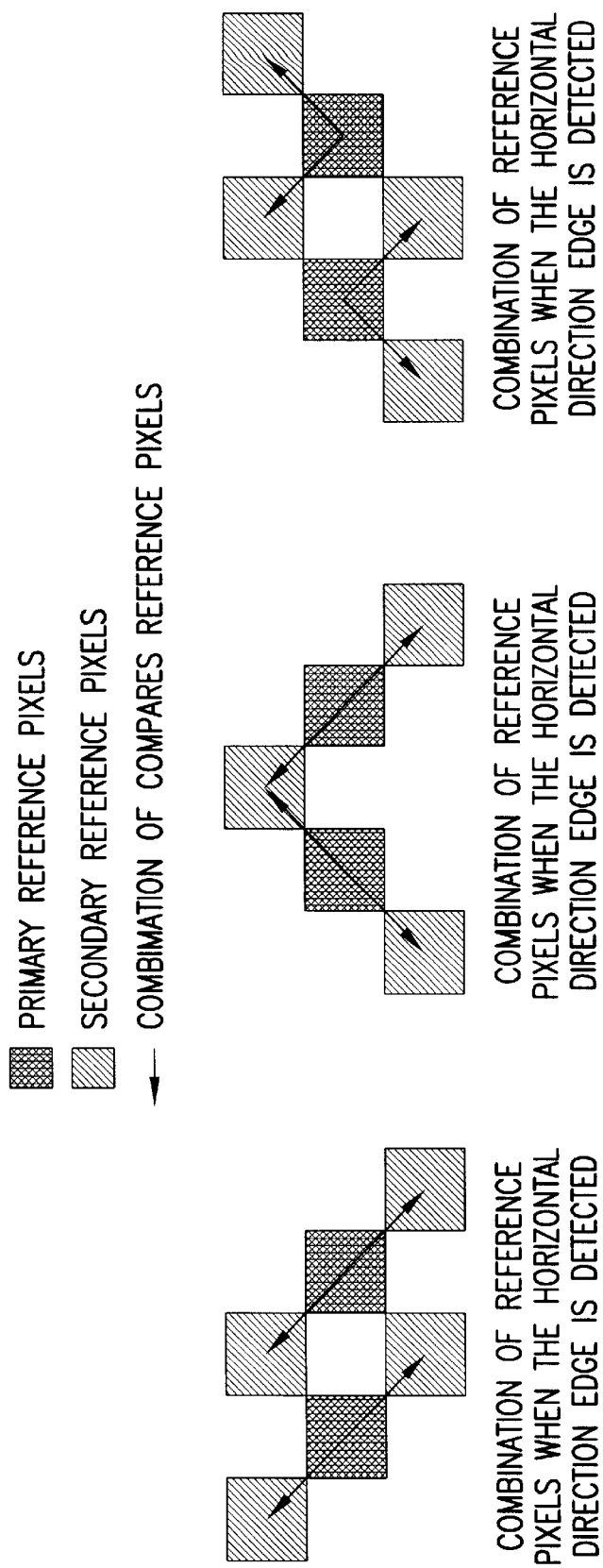

PIXEL ARRANGEMENT OF THE THIRD EMBODIMENT

| R | W | R | W | R | W | R | W |
|---|---|---|---|---|---|---|---|
| W | B | W | B | W | B | W | B |
| R | W | R | W | R | W | R | W |
| W | B | W | B | W | B | W | B |
| R | W | R | W | R | W | R | W |

W  PIXEL THAT INCLUDES ALL WAVELENGTHS R, G, B

IMAGE PROCESSING METHOD AND DEVICE AND RECORDING MEDIUM IN WHICH IMAGE PROCESSING PROGRAM IS RECORDED

INCORPORATION BY REFERENCE

The disclosure of the following priority application is herein incorporated by reference: Japanese Patent Application No. 9-285536, filed Oct. 17, 1997.

BACKGROUND OF THE INVENTION

1. Field of Invention

The present invention relates to an image processing method and device used, for example, in a color imaging device, and also to a recording medium on which is recorded an image processing program, and especially relates to pixel interpolation processing technology.

2. Description of Related Art

Generally, when a color image is photographed by using, for example, a video camera, a digital still camera or the like, incident light is passed through a filter and specified wavelength components in the incident light are extracted. In this way, for example, the light of each basic color component of R (red), G (green) and B (blue) is obtained.

Various methods of color image photography are known, such as a single plate method, a two-plate method, a three-plate method and a multiple-plate method, depending on the number of installed imaging units, e.g., CCD image sensors, in a device. However, in lower cost devices, often a single imaging unit is used.

When light from an object is separated into the three color components, R, G and B and all the color components are simultaneously photgraphed with a single imaging unit, three kinds of filters corresponding respectively to red, green and blue are arranged in a plane. The incident light which passes through the filter is directed at the imaging unit.

The two-dimensional image which is transmitted to the imaging unit is formed of many pixels that are arranged in the vertical and horizontal directions. Each pixel of the two-dimensional image includes only red, green or blue color light since the light has passed through one of the three kinds of filters corresponding respectively to red, green and blue.

For example, when the type of filter is changed for every pixel, and the filters are cyclically aligned in the order of R, G, B, R, G, B . . . in a horizontal direction, the color of pixels that are aligned in the horizontal direction become R, G, B, R, G, B . . . .

Accordingly, the information of the photographed object can be obtained only once every three pixels for any color component for red, green or blue. In other words, the object cannot be photographed other than in units of three pixels.

For all the pixels of the two-dimensional image, a pixel interpolation is implemented in order to obtain the color components of the red, green and blue colors. Therefore, information corresponding to color components of a missing pixel is created based on, i.e., interpolated from, information corresponding to pixels in the vicinity of the missing pixel.

Generally, when this kind of pixel interpolation is performed, a value corresponding to the interpolated pixel is formed by simply averaging values corresponding to a plurality of pixels that exist around the position of the pixel which is to be interpolated. Moreover, there is also a case in which the interpolated pixel is formed from two pixel values that remain when the maximum and minimum value pixels are removed from 4 pixels that exist around the position of the pixel to be interpolated.

Technology for detecting an edge of an image with reference to surrounding pixels of different color components based on a color component of an interpolated pixel is well known.

Additionally, Japanese Laid-Open Patent Application 6-339145, U.S. Pat. No. 5,373,322, U.S. Pat. No. 5,053,861 and U.S. Pat. No. 5,040,064 disclose methods and devices in accordance with what is known in the art.

However, when an interpolated pixel is formed by simply averaging the values of the plurality of pixels existing around the interpolated pixel, a high frequency component of a spatial frequency of an image is easy to overlook. In other words, the edge component is easy to miss. Accordingly, resolution of a photographed image is decreased.

Moreover, when an image edge is detected with reference to surrounding pixels with color components different from the color component of the interpolated pixel, image shifting occurs in image areas where a luminance change and a color change do not match.

Further, in order to form an interpolated pixel with a comparatively high quality, processing including various complicated calculations is necessary. Accordingly, a resulting device becomes incredibly complicated and processing speeds become slow.

SUMMARY OF THE INVENTION

Accordingly, aspects of the present invention are directed at realizing formation of a high quality interpolated pixel by comparatively simple processing.

The present invention relates to image processing in which, for example, pixels of a first color component of an image are arranged at every other pixel in vertical and horizontal directions on a two-dimensional pixel array. Pixels of second color component and third color component are arranged uniformly throughout remaining positions in the two-dimensional pixel array. At each pixel position, an interpolated pixel is generated by interpolation when a pixel color component does not exist at that position. When a pixel at a target position where the given color component does not exist is interpolated, a value associated with one of primary reference pixels of the given color component located adjacent to the target position at the top and bottom or left and right of the target position is compared to values respectively associated with secondary reference pixels of the given color component existing in the vicinity of the primary reference pixel to detect an image edge component. When an image edge component is detected, an interpolated pixel is formed based on reference pixels of the given color component at the top and bottom or left and right of the target pixel. Interpolation is further performed by applying a weighting coefficient for reference pixels at the top and bottom of the target position and a weighting coefficient for reference pixels to the left and right of the target position. The top-bottom weighting coefficient is set to a different value than the left-right weighting coefficient.

According to one aspect of the present invention, image processing with improved image edge component detection may be performed by forming an interpolated pixel based on reference pixels of a given color component existing at positions adjacent to the top, bottom, left and right of a target position. A weighting coefficient of reference pixels on a detected image edge may be set to be larger than the other reference pixels. Additionally, a total sum of weighting coefficients of reference pixels may be normalized.

According to an aspect of the present invention, image processing with improved image edge component detection may be performed by forming an interpolated pixel based on two reference pixels of a given reference color component existing in positions on a detected image edge and adjacent to the top, bottom, left or right of a target position. The weighting coefficient of the reference pixels that do not exist on the edge may be set to zero.

According to an aspect of the present invention, image processing with improved image edge component detection may be performed by comparing each of two primary reference pixels of a primary color component existing at the top and bottom or left and right of a target position with four secondary reference pixels of the given color component existing in the vicinity of the primary reference pixels. An image edge component is detected when comparison of the primary color components and the given pixel color components fulfills a predetermined condition.

Additionally, the present invention provides an image processing apparatus that provides the above-described image processing with the improved image edge component detection.

Further, another aspect of the present invention provides a recording medium on which is recorded an image processing program, to be carried out by a computer, which performs the above-described image processing with the improved image edge component detection.

According to one aspect of the present invention, image data is assumed to be in a two-dimensional pixel arrangement such as, for example, a Bayer arrangement. A pixel of a first color component, for example, the G color component, is arranged in every other pixel in the vertical direction and in the horizontal direction, and pixels of a second color component, for example, the R color component, and pixels of a third color component, for example, the B color component, are equally arranged in the remaining positions.

Generally, the eyesight of a human is sensitive to the green wavelength, and is insensitive to the red and blue wavelengths. Accordingly, the value of the G color component is not greatly different from the luminance of the image which includes all the wavelengths of red, green and blue.

In a Bayer arrangement, two pixels of green color are arranged for every four pixels. Therefore, the proportion of G component pixels in the two-dimensional pixel arrangement is large. The resolution of the image is improved if this kind of pixel arrangement is adopted. Luminance component pixels that are pixels of a first color component which have a large pixel proportion in the two-dimensional pixel arrangement are interpolated. Performing suitable interpolation for pixels of the first color component effectively improves the resolution of the image.

In one aspect of this invention, when a pixel at a target position where the given color component does not exist is interpolated, a value associated with one of primary reference pixels of the given color component located adjacent to the target position at the top and bottom or left and right of the target position is compared to values respectively associated with secondary reference pixels of the given color component existing in the vicinity of the primary reference pixel to detect an image edge component. Specifically, adjacent positions at the top and bottom or left and right of the target position are checked for primary reference pixels.

Additionally, the areas around the aforementioned primary reference pixels are checked for secondary reference pixels of the first color component. The existence of non-existence of an image edge component is identified.

When an image edge component is detected, an interpolated pixel is formed based on reference pixels of the first color component existing in adjacent positions at the top, bottom, left and right of the target position. Moreover, a weighting coefficient for the reference pixels at the top and bottom of the target position and a weighting coefficient for the reference pixels at the left and right of the target pixel are set at mutually different values.

In the vicinity of an edge position which extends in the vertical direction in the image, the change of brightness between adjacent pixels is large in the horizontal direction and small in the vertical direction. Moreover, in the vicinity of the position of an edge which extends in the horizontal direction in the image, the change of brightness between adjacent pixels is large in the vertical direction and small in the horizontal direction. Accordingly, when an edge in the vertical direction is detected, resolution in the horizontal direction is improved when influence of the reference pixels at the left and right of the target position is reduced and influence of the reference pixels at the top and bottom of the target position is increased. Similarly, when an edge in the horizontal direction is detected, resolution in the vertical direction is improved when influence of the reference pixels at the top and bottom of the target position is reduced and influence of the reference pixels at the left and right of the target position is increased.

Since existence or non-existence of the image edge component is detected by the simple comparison of the pixels, the ease of processing is improved and the time required to form the interpolated pixel is reduced. Moreover, since an interpolated pixel of a first color component is formed based on reference pixels of the first color component, even when shifting occurs between a position in which luminance changes and a position in which hue changes, an interpolated pixel is more indicative of the original image.

In another aspect of the invention, a weighting coefficient of the reference pixels on the detected edge is large and the weighting coefficient of the reference pixels which are adjacent to the detected edge is small. When an edge in the vertical direction is detected, the influence of the reference pixels at the left and right of the target position is reduced and the influence of the reference pixels at the top and bottom of the target position is increased. Accordingly, the resolution in the horizontal direction is improved. Moreover, when an edge in the horizontal direction is detected, the influence of the reference pixels at the top and bottom of the target position is reduced and the influence of the reference pixels at the left and right of the target position is increased. Accordingly, resolution in the vertical direction is improved. Therefore, the brightness of the interpolated pixel is suitably controlled by normalizing the weighting coefficients applied to the reference pixels to make the total sum of the weighting coefficients for the reference pixels become one.

In another aspect of the invention, when two reference pixels positioned on the detected edge significantly influence an interpolated pixel, the influence of the reference pixels positioned adjacent to the detected edge is nullified. Therefore, when an edge in the vertical direction is detected, there is no influence of the reference pixels at the left and right of the target position and the interpolated pixel is formed based on only the reference pixels at the top and bottom of the target position. Accordingly, the resolution in the horizontal direction is improved. When an edge in the horizontal direction is detected, there is no influence of the reference pixels at the top and bottom of the target pixel. Therefore, the interpolated image is formed according to only the reference pixels at the left and right of the target pixel. As a result, resolution in the vertical direction is improved.

In another aspect of the invention, each of two primary reference pixels of a first color component existing in adjacent positions at the top and bottom or the left and right of the target position are compared with our pixels of the first color component existing in the vicinity of the aforementioned reference pixels. When all these comparisons satisfy a predetermined condition, the image edge component is detected. For example, an edge in the vertical direction is considered as detected when a primary reference pixel positioned on the top side of the target position has a value associated with it that is larger than the values associated with the four secondary reference pixels that are in the vicinity of the one primary reference pixel. Moreover, an edge in the horizontal direction is considered as detected when one primary reference pixel positioned at the left side of the target position has a value associated with it that is larger than the values associated with the four secondary reference pixels that are in the vicinity of the one primary reference pixel.

According to another aspect of the invention, an interpolation controller forms an interpolated pixel in a target position where a pixel of a given color component does not exist. A value associated with one of primary reference pixels of the given color component located adjacent to the target position at the top and bottom or left and right of the target position is compared to values respectively associated with secondary reference pixels of the given color component existing in the vicinity of the primary reference pixel to detect an image edge component.

When an image edge component is detected, the interpolated pixel is formed based on the reference pixels of the first color component that exist in the adjacent positions at the top, bottom, left and right of the target position. Moreover, the weighting coefficient for the reference pixels at top and bottom of the target position and the weighting coefficient for the reference pixels at the left and right of the target pixel are fixed with mutually different values.

For example, it is considered that in the vicinity of an edge position which extends in the vertical direction in the image, the change of the brightness is large between the pixels that are adjacent to each other in the horizontal direction, and the change of brightness is small in the vertical direction. Moreover, in the vicinity of the position of an edge which extends in the horizontal direction in the image, the change of brightness between pixels that are adjacent to each other is large in the vertical direction, and the change of the brightness is small in the horizontal direction. Accordingly, when an edge in the vertical direction is detected, the influence of the reference pixels at left and right of the target pixel is reduced and the influence of the reference pixels at the top and bottom of the target pixel is increased and the resolution in the horizontal direction is improved.

Moreover, when an edge in the horizontal direction is detected, the influence of the reference pixels at the top and bottom of the target pixel is made to be small and the influence of the reference pixels at the left and right of the target pixel is made to be large and the resolution in the vertical direction is improved.

Since the existence or non-existence of an image edge component is detected by the simple comparison of the pixels, the processing is very easy, and the time necessary for forming the interpolated pixel is short. Moreover, an interpolated pixel of the first color component is formed based on reference pixels of the first color component, even when shifting occurs between the position at which the luminance changes and the position at which the hue changes, and an interpolated pixel which is faithful to the original image can be formed.

A recording medium which records the image processing program of the present invention is readable by a computer. The recording medium can be, for example, a CD-ROM, a RAM, a computer hard drive or a carrier wave in which the image processing program is transmitted as a computer data signal. Subsequently, the computer executes the image processing program. The interpolated pixel is formed as the computer follows this image processing program. When the interpolated pixel is formed at the target position at which a pixel of the first color component does not exist, the relative values between the primary reference pixels of the first color component existing in adjacent positions at the top and bottom or left and right of the target pixel and the secondary reference pixels of the first color component which exist in the vicinity of the aforementioned primary reference pixels are compared.

According to this comparison result, the existence or non-existence of an image edge component is identified. When the image edge component is detected, an interpolated pixel is formed based on the reference pixels of the first color component that exist in the positions that are adjacent at the top and bottom or left and right of the target pixel. In addition, the weighting coefficient for the reference pixels at the top and bottom of the target pixel and the weighting coefficient for the reference pixels at the left and right of the target pixel are set to mutually different values.

Since this image processing program can be widely executed without depending on specific hardware, the image processing program can be executed by reading-in with personal computers or work stations that are widely used.

BRIEF DESCRIPTION OF THE DRAWINGS

The invention will be described in conjunction with the following drawings in which like reference numerals designate like elements and wherein:

FIGS. 4A–4C are plan views illustrating a photographed two-dimensional image separated into separate color components.

FIGS. 5A–5C are plan views illustrating a condition in which an interpolated pixel is added to image data of each color component illustrated in FIGS. 4A–4C.

FIG. 9 is a plan view illustrating an example of the formation condition of interpolated pixels of the red and blue colors.

FIGS. 13A–13C are plan figures illustrating the pixels referenced during edge detection.

FIGS. 14A–14H are plan views illustrating the combination of the reference pixels that are compared for edge detection according to a second embodiment.

FIGS. 15A–15F are plan views illustrating the combination of the reference pixels that are compared for edge detection according to a third embodiment.

DETAILED DESCRIPTION OF PREFERRED EMBODIMENTS

Figure 1:
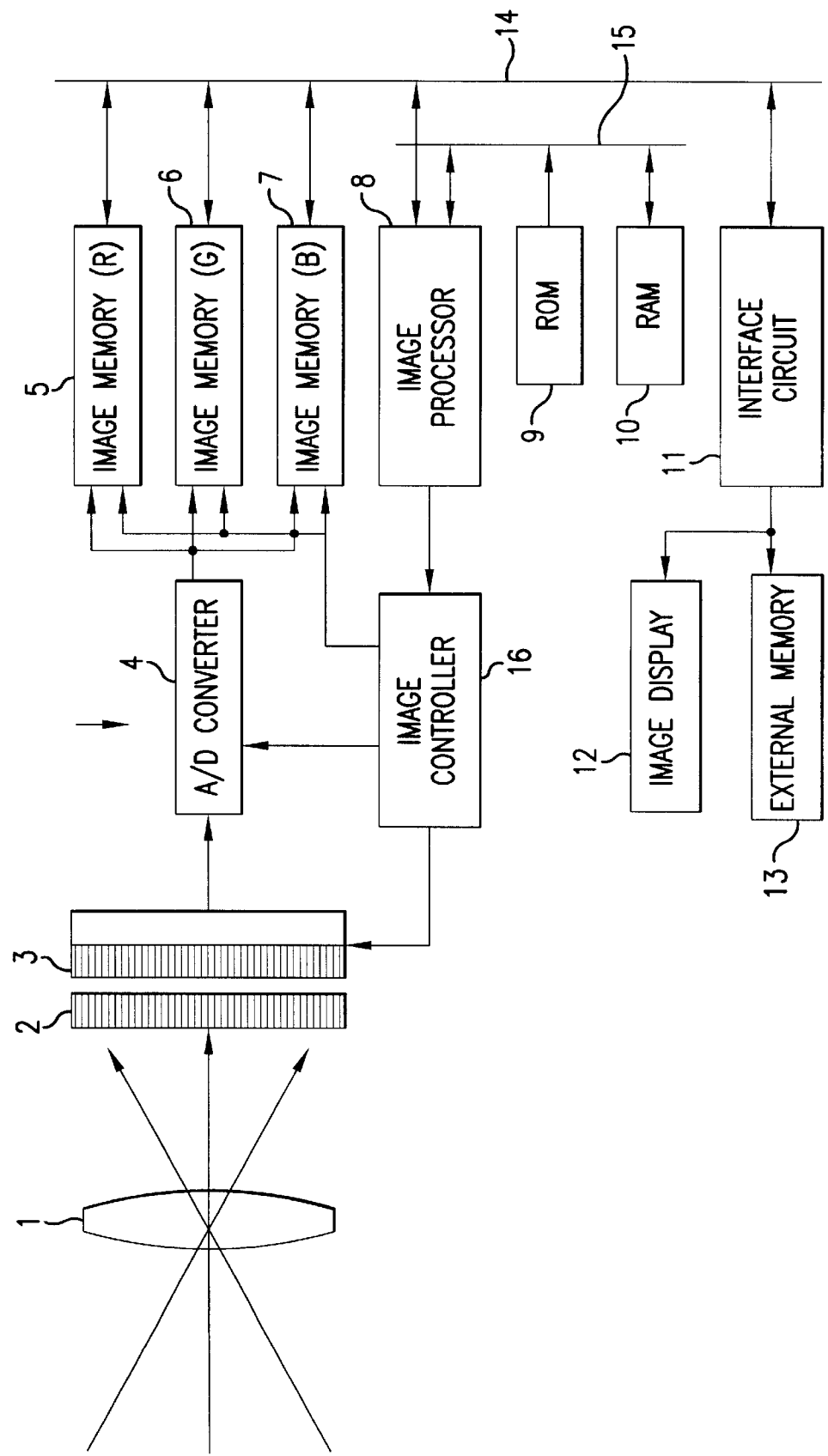
FIG. 1 is a block diagram illustrating the structure of a color imaging device.

According to the present invention, an interpolating means may include, for example, an image processor 8 illustrated in FIG. 1. A recording medium may be, for example, the ROM 9.

Referring to FIG. 1, this imaging device comprises an imaging lens 1, a filter 2, a two-dimensional image sensor 3, an A/D converter 4, image memories 5, 6 and 7, an image processor 8, a ROM 9, a RAM 10, an interface circuit 11, an image display device 12, an external memory 13 and an imaging controller 16.

Light from the object passes through the imaging lens 1 and the filter 2, then is image-formed on the imaging surface of the two-dimensional image sensor 3.

The filter 2 transmits, i.e., passes, specified wavelength components of the light incident on the filter. In the filter 2 shown in FIG. 2, the components of the transmitted light are formed of very small areas 2R, 2G and 2B of R (red) color G (green) color and B (blue) color light. Each one of the very small areas 2R, 2G and 2B corresponds to a pixel of the two-dimensional image sensor 3 as a 1 to 1 relationship.

Figure 3:
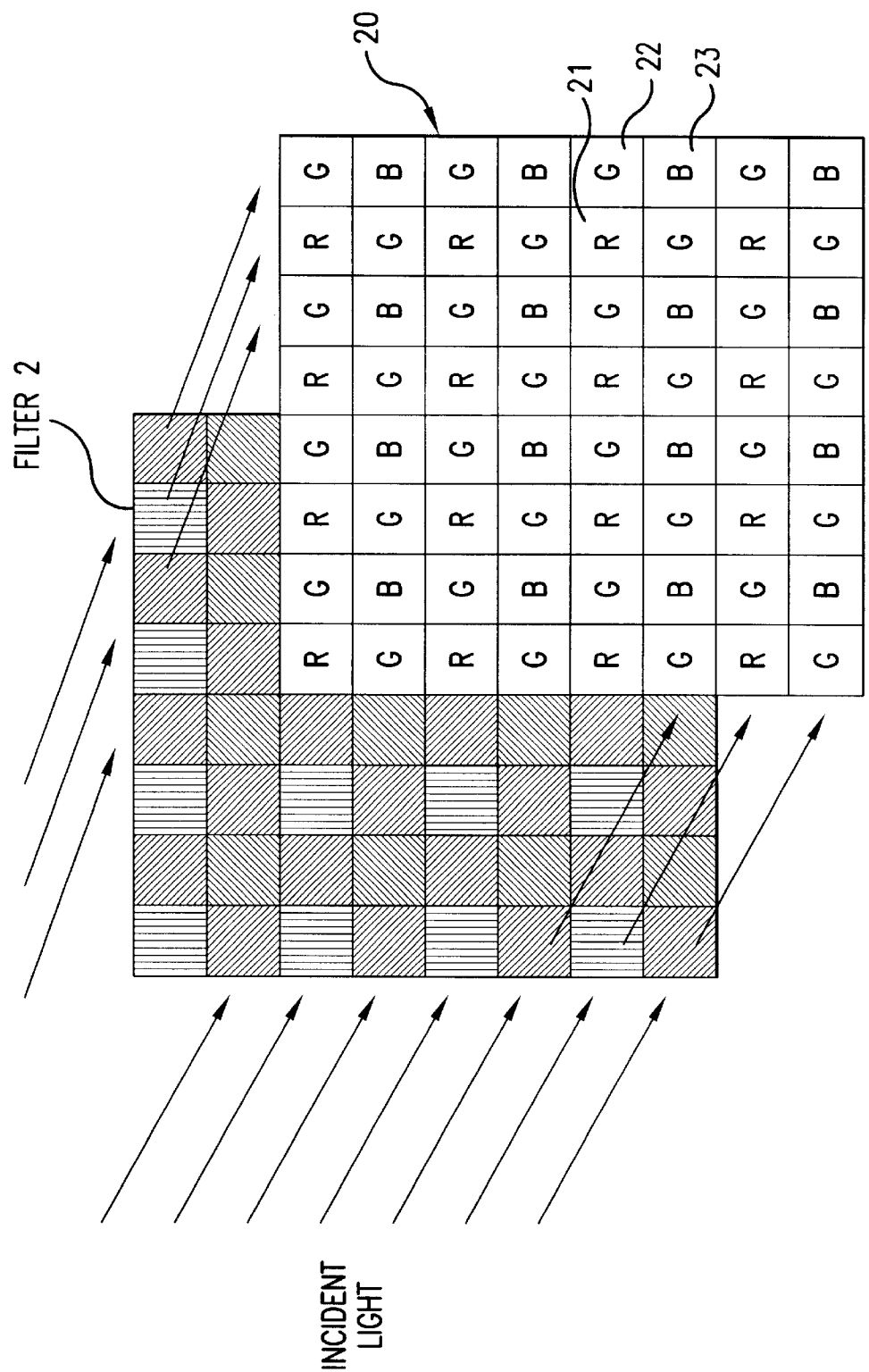
FIG. 3 is a perspective view illustrating the distribution of color components of each of the pixels that form the two-dimensional image received by the two-dimensional image sensor.

Accordingly, in the two-dimensional image 20 imaged on the two-dimensional image sensor 3 illustrated in FIG. 3, each component of the G color pixels 22 and the B color pixels 23 is aligned. The pixel arrangement of the two-dimensional image 20 shown in FIG. 3 is called a Bayer arrangement.

The imaging device of FIG. 1 only comprises a single filter 2 and a single two-dimensional image sensor 3. Accordingly, the obtained image information is the two-dimensional image 20 shown in FIG. 3. For a pixel unit, only one component of either the red color, the green color or the blue color is obtained. In order to obtain all the components of the red, green and blue colors for all pixel units, pixel interpolation is executed. This processing is explained below.

The two-dimensional image sensor 3 is an imaging unit which uses a CCD element. As an alternative to a CCD, other possible photoelectric converters include, for example, a photo-sensitive-diode (PSD) and CMOS devices. The two-dimensional image sensor 3 outputs signals that show the brightness of each pixel of the photographed two-dimensional image in order of pixel units.

The two-dimensional image sensor 3 outputs an analog pixel signal that is converted to a digital signal for every pixel by the A/D converter 4. The digital signal output by the A/D converter 4 is stored in one of the image memories 5, 6 and 7, according to the color of the particular pixel. The red, green and blue pixels are stored respectively in the image memories 5, 6 and 7.

The image processor 8 is formed by a microcomputer. The program executed by this microcomputer is stored in the read-only memory (ROM) 9. The image processor 8 reads the content of the ROM 9 via the bus 15, and the program is executed. A random access memory (RAM) 10 is connected to the image processor 8 via the bus 15. The image processor 8 performs the write-in and read-out of data to RAM 10 as necessary. The image processor 8 controls the two-dimensional image sensor 3, the A/D converter 4 and the image memories 5, 6 and 7 via the imaging controller 16 and executes the imaging of the image. The image processor 8 controls charge accumulation and signal read-in with respect to the two-dimensional image sensor 3. The image processor 8 executes sampling and controls conversion timing with respect to the A/D converter 4. Also, the image processor 8 selects the image memory corresponding to a particular color component and controls data write-in timing with respect to image memories 5, 6, and 7.

After the two-dimensional image data is written into the image memories 5, 6 and 7, the image processor 8 executes interpolation of missing color component for each pixel position. The content of this processing is explained herein. With respect to the signal of the two-dimensional image sensor 3, it is possible to interpolate the pixel substantially in real time. However, in order to make the circuit structure simple, the interpolated pixel preferably is formed by software processing after all the image data are stored in the image memories 5, 6 and 7.

When interpolation of the pixels is completed, the image processor 8 transfers the image data stored in the image memories 5, 6 and 7 to the interface circuit 11 as needed. This image data is input to the image display 12 or the external memory device 13 via the interface circuit 11. The image display 12 is provided to display the photographed two-dimensional image. The image display 12 may include, for example, a liquid crystal display unit. The external memory 13 is provided to store the data of the shot two-dimensional image. The external memory 13 may comprise an exchangeable disk-shaped recording medium, for example.

Figure 10:
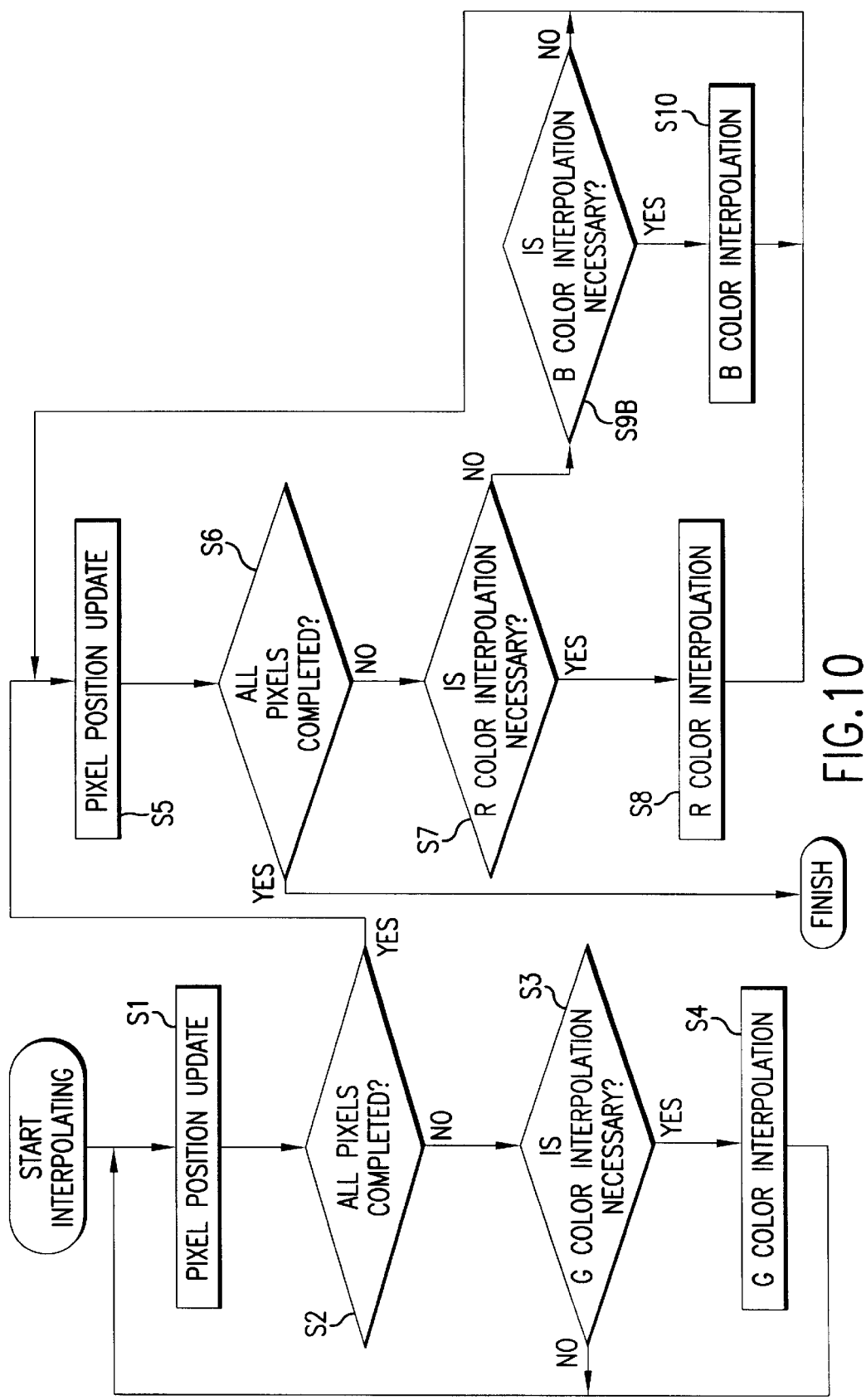
FIG. 10 is a flow chart illustrating the content of the interpolation processing executed by the image processor.

FIG. 10 illustrates one manner of interpolation processing executed by the image processor 8 according to the present invention. In the two-dimensional image data 20 shown in FIG. 3, only one color component exists for each pixel. Therefore, the image data stored in the image memories 5, 6 and 7 illustrated in FIGS. 4A–4C is missing pixels for each of the red, green and blue color components. These missing pixels are replaced in the two-dimensional data by forming interpolated pixels by interpolation processing as shown in FIG. 10. The interpolated pixels are also stored in the image memories 5, 6 and 7. Pixel data arrangement after interpolation of missing pixels is shown in FIGS. 5A–5C.

Referring to FIGS. 5A–5C, pixels Gi, Ri and Bi are formed by interpolation. The effective pixel data for all the pixel positions are set.

In step S1, a location of a target position is decided. That is, the target position within the plurality of pixels that form the two-dimensional image to be processed is decided. Initially, the target position is at the left top edge corner of the image. Subsequently, every time step S1 is executed, the target position is successively shifted one pixel unit in the horizontal direction or the vertical direction. When the target position exceeds the position at the right bottom comer of the image, i.e., the final pixel position, the target position returns to the initial position of the left top comer.

Figure 2:
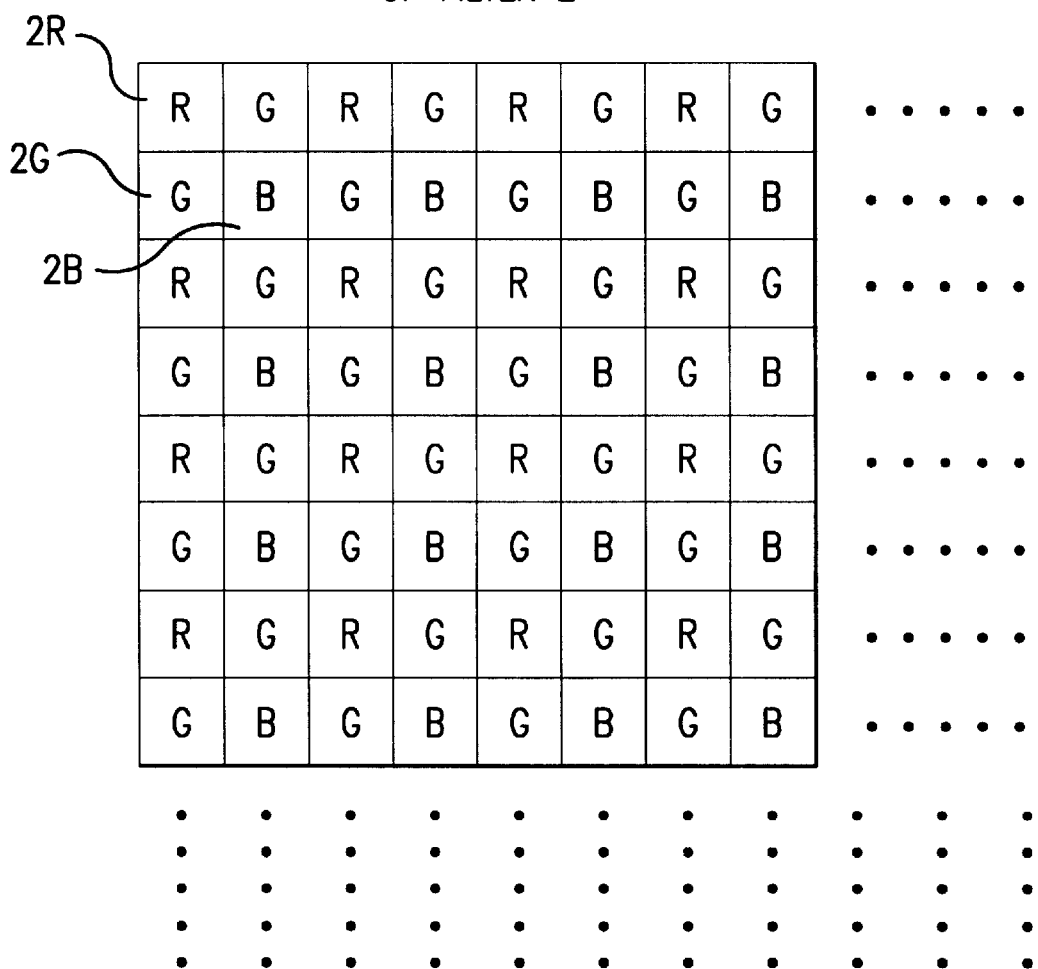
FIG. 2 is a plan view illustrating the distribution of the transmitted color components passing through a filter.

Step S2 determines whether the interpolation of all the pixels of the color component are completed. If the interpolation processing is not completed, processing proceeds to step S3. Step S3 identifies whether effective pixel data of the color component exist at the target position of the image data. The relative position of the transmitted color component array produced by the filter 2 and the photographed pixel array are predetermined as shown in FIG. 3. Accordingly, it can be known in advance which component of the red, green or blue colors exist at each pixel position and which component is missing. In other words, since the red, green and blue color pixels are cyclically aligned with each other as shown in FIG. 2, the position of each color component can be checked by calculation.

Figure 11:
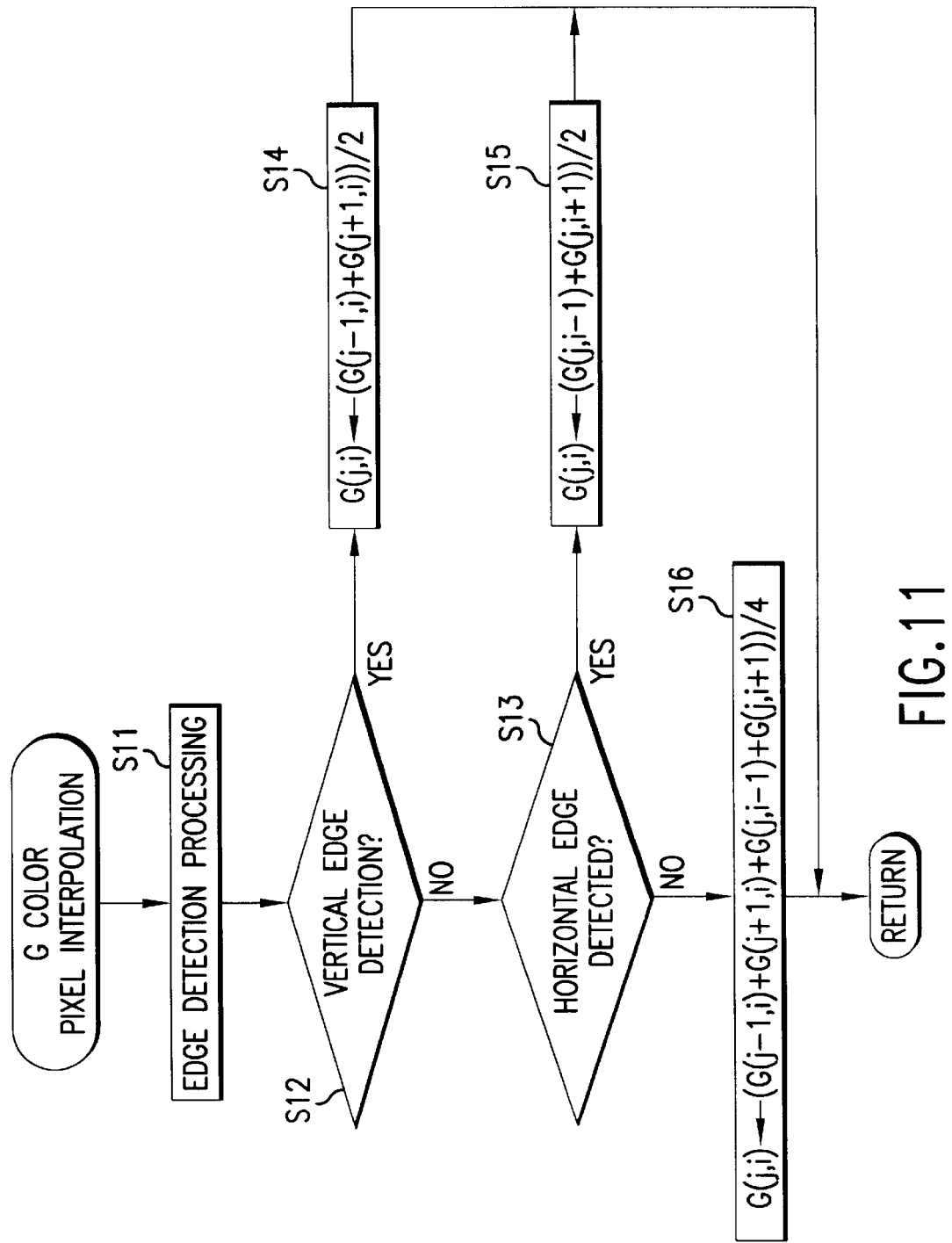
FIG. 11 is a flow chart illustrating the content of step S6 illustrated in FIG. 10.
Figure 12:
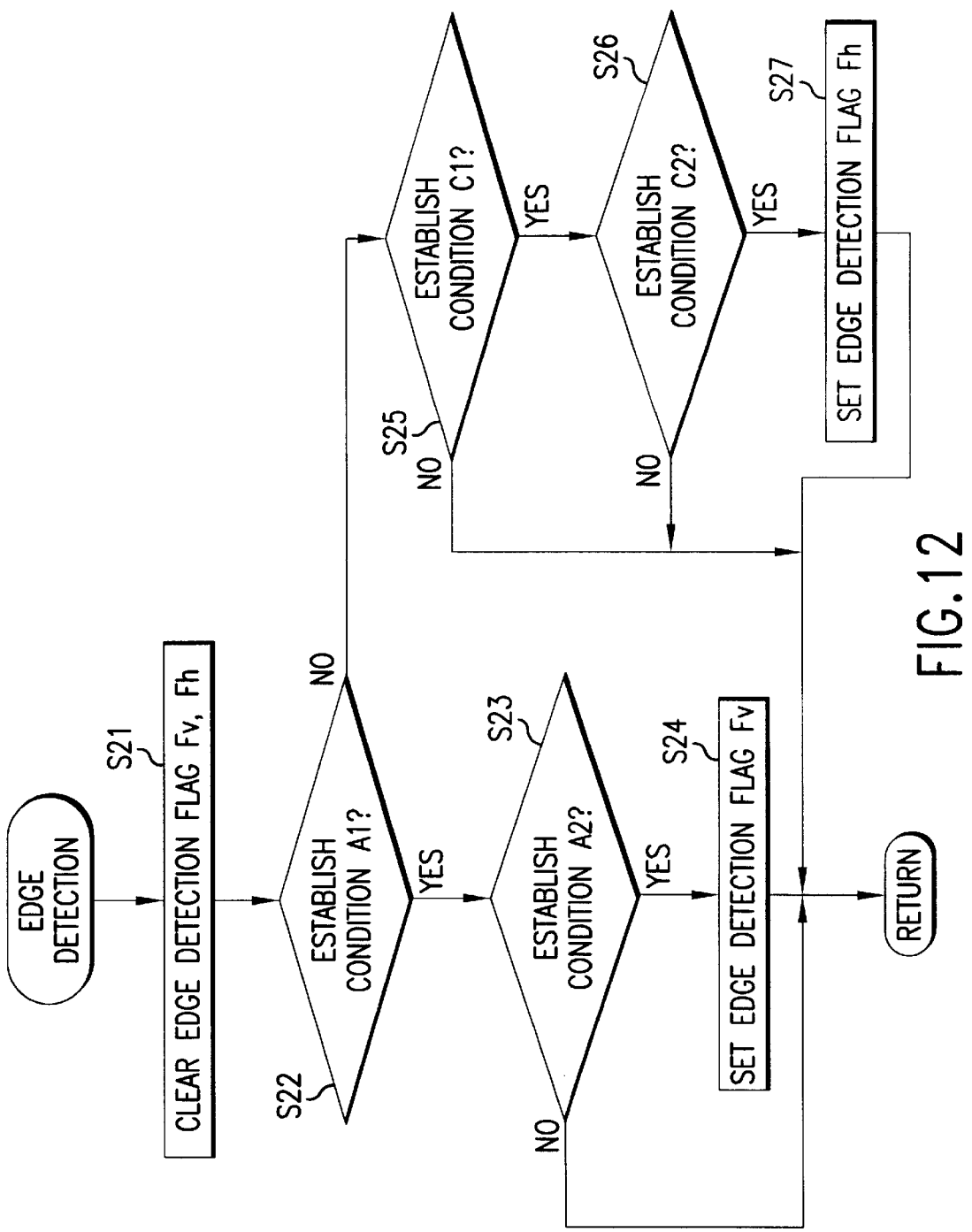
FIG. 12 is a flow chart illustrating the content of step S11 of FIG. 11.
Figure 14A:
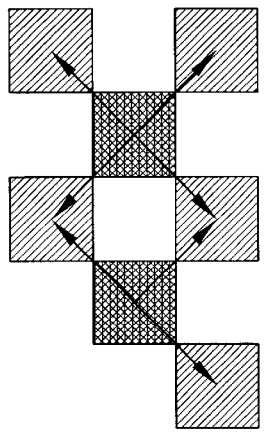
Figure 14B:
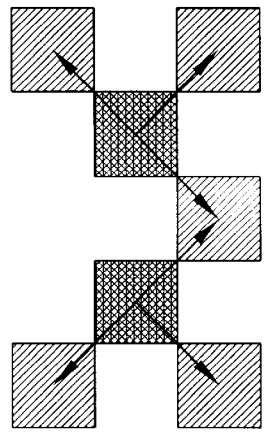
Figure 14C:
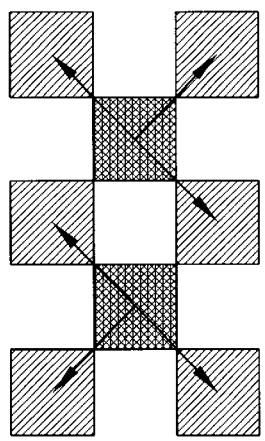
Figure 14D:
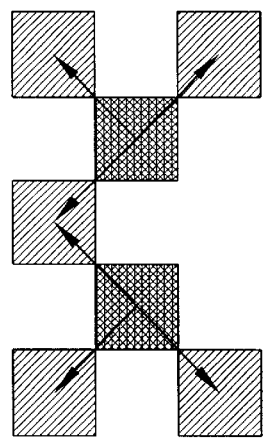

For example, when the green color component does not exist at the target position, control proceeds to step S4 to interpolate that color component. Alternatively, when the green color component exists at the target position, control returns to step S1. At step S4, the green color component is interpolated. The details of the processing conducted during step S4 are shown in FIG. 11. Each constituent step of S4 is explained with reference to FIG. 11. As shown in FIG. 11, step S11 begins the check of whether an edge component in the vertical and/or horizontal direction of the image exists at the target position with reference to the information of pixels in the vicinity of the target position. The details of this processing are shown in FIG. 12, explained later. At the step S12, the existence or non-existence of an edge in the vertical direction is identified. When an edge in the vertical direction is detected, the edge detection flag Fv is set, and, therefore, the condition of this flag is checked. When the edge detection flag Fv is set, control proceeds to step S14. When the edge detection flag Fv is cleared, control proceeds to step S13. During step S13, the existence or non existence of an edge in the horizontal direction is identified based on the result of step S11. When an edge in the horizontal direction is detected, the edge detection flag Fh is set, and, therefore, the condition of this flag is checked. When the edge detection flag Fh is set, control proceeds to step S15. When the edge detection flag Fh is cleared, control proceeds to step S16.

When an edge in the vertical direction is detected in step S12, pixel interpolation is performed using the below equation at step S14.

$$G(j, i)=(G(j-1, i)+G(j+1, i))/2 \quad (1)$$

where:
G(j, i) is the interpolated pixel at the target position of the G color at the jth row and ith column coordinate;
G(j−1, i) is the reference pixel at the top side of the target pixel G(j, i); and
G(j+1, i) is the reference pixel at the bottom side of the target pixel G(j, i).

Figure 6:
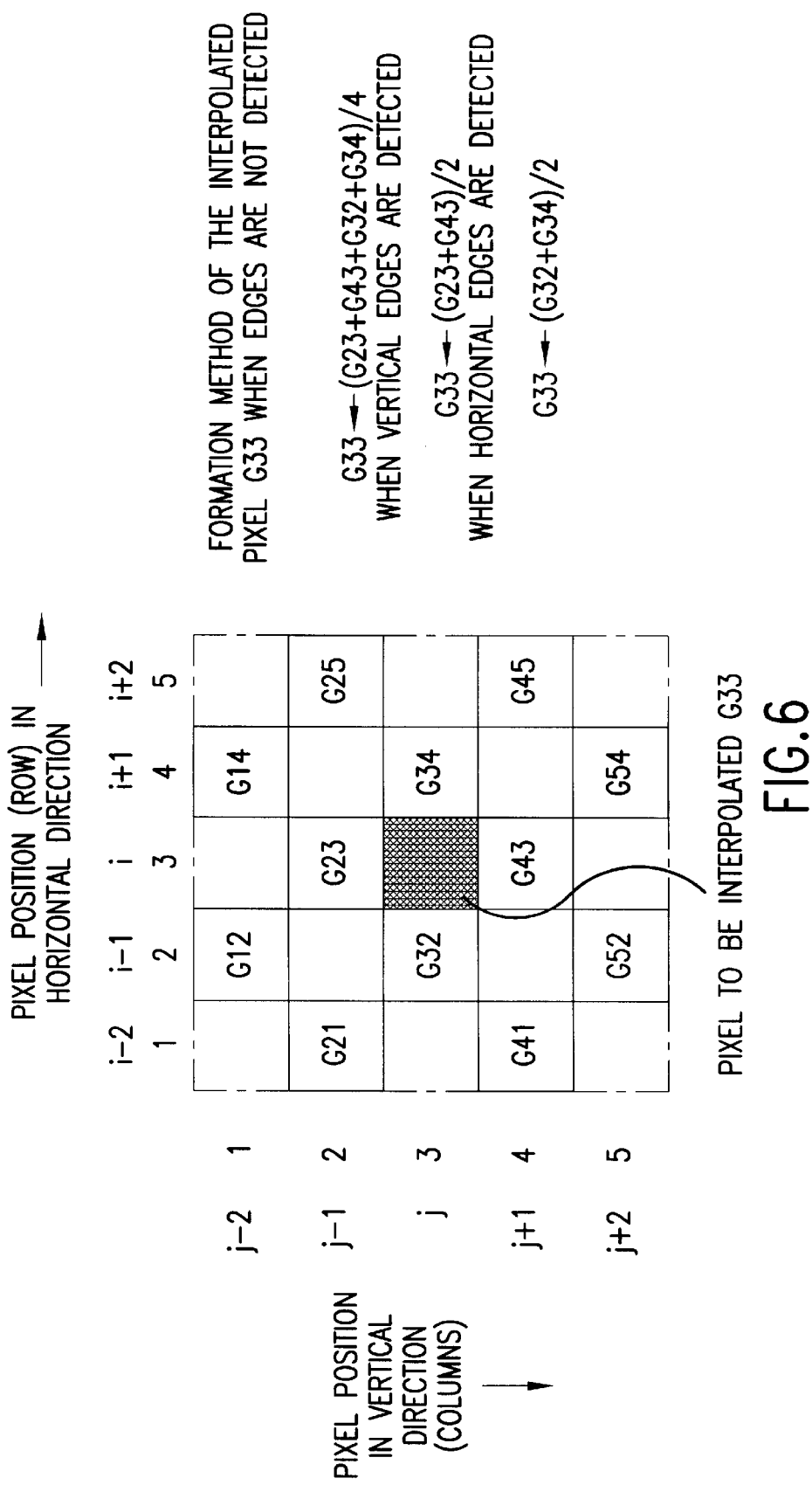
FIG. 6 is a plan view illustrating pixels referenced when an interpolated pixel of the G component is formed.

As an illustrative example, suppose an interpolated pixel G33 is formed at the center of a target position (i, j) as shown in FIG. 6. Calculating the values associated with the interpolated pixel G33 is performed by the following equation.

$$G33=(G23+G43)/2 \quad (2)$$

Therefore, when a position to be interpolated is on an image edge in a vertical direction, influence of pixels adjacent at the left and right of the interpolated pixel is reduced to zero. As a result, the interpolated pixel is formed as the average value of two pixels that are adjacent at the top and bottom of the interpolated pixel.

Although equations (1) and (2) indicate that the influence of pixels that are adjacent at the left and right of the interpolated pixel should be 0. It is acceptable to interpolate by allowing the adjacent pixels at the left and right of the target position to influence the interpolation calculation by using an equation such as equation (3) below.

$$G33=(g1 \cdot (G23+G43)/2)+(g2 \cdot (G32+G34)/2) \quad (3)$$

where:
g1>g2, and g1+g2=1.

When an edge in the horizontal direction is detected, at step S15, the value associated with the interpolated pixel is formed by the following equation.

$$G(j, i)=(G(j, i-1)+G(j, i+1))/2$$

where:
G(j, i) is the interpolated pixel at the target position of the G color of the jth row and ith column coordinate; G(j, i−1) is the reference pixel at the left side of the target pixel G(j, i); and G(j, i+1) is the reference pixel at the right side of the target pixel G(j, i).

As an illustrative example of this processing, when an interpolated pixel G33 is to be formed at the center of a target position (i, j) as shown in FIG. 6, the interpolated pixel G33 is advantageously formed by the following equation.

$$G33=(G32+G34)/2 \quad (5)$$

When the target position of the pixel to be interpolated is at an edge in the horizontal direction, the influence of the pixels adjacent to the top and bottom of the target position is reduced to zero. Therefore, the interpolated pixel is formed as the average value of two pixels that are adjacent at the left and right of the interpolated pixel. In equations (4) and (5), the influence of the pixels adjacent to the target position at the top and bottom of the interpolated pixel should be 0. It is acceptable to interpolate by allowing the adjacent pixels at the top and bottom of the target position to influence the interpolation calculation by using equation (6) below.

$$G33=(g1 \cdot (G23+G43)/2)+(g2 \cdot (G32+G34)/2) \quad (6)$$

where: g1<g2, and g1+g2=1

When no edge is detected, the interpolated pixel is formed by the following equation at step S16.

$$G(j, i)=(G(j-1, i)+G(j+1, i)+G(j, i-1)+G(j, i+1))/4 \quad (7)$$

where: G(j, i) is the interpolated pixel at the target position of the G color of the jth row and ith column coordinate As an illustrative example of processing in accordance with the present invention, suppose the interpolated pixel G33 is formed at the center of the target position (i, j) as shown in FIG. 6. Then the interpolated pixel G33 is formed by the equation below.

$$G33=(G23+G43+G32+G34)/4 \quad (8)$$

Figure 7:
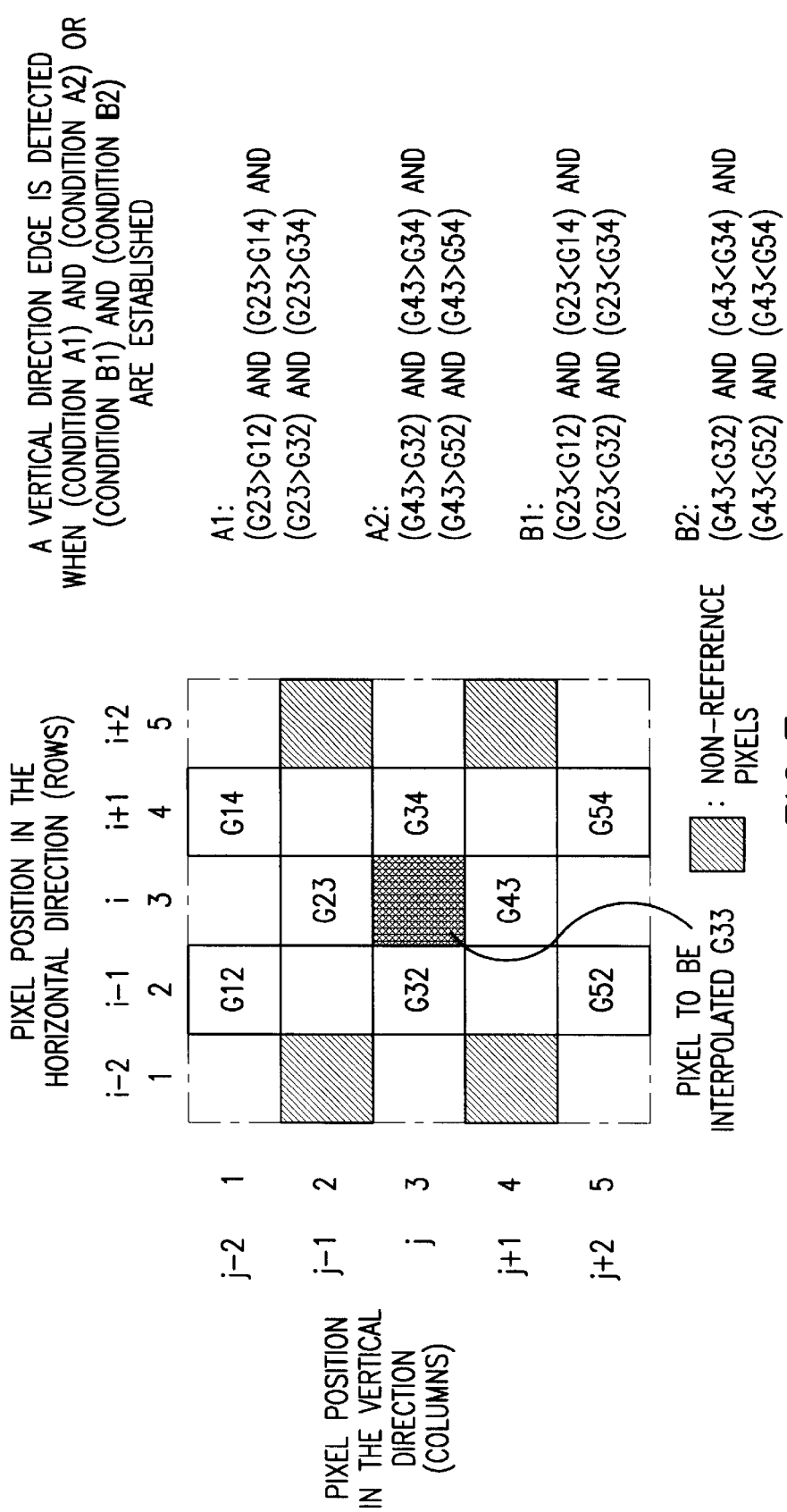
FIG. 7 is a plan view illustrating pixels referenced to detect an edge in a vertical direction and the detecting conditions.

The further detail regarding the nature of "edge detection processing" in step S11 is shown in FIG. 12 and FIG. 13C. In step S21, the edge detection flags Fv, Fh are cleared. Subsequently, in step S22, for the predetermined condition A1, it is determined whether the pixel pattern of the target position is adopted. For example, as shown in FIG. 7, when pixel G33 is interpolated, the condition A1, true or false, of the comparison equations is checked.

$$(G23>G12) \text{ and } (G23>G14) \text{ and } (G23>G32) \text{ and } (G23>G34) \quad (9)$$

where: "and" is a logical product.

For example, as shown in FIG. 13A, a primary reference pixel positioned at the top side of the target position is compared to four secondary reference pixels existing in the vicinity of the primary reference pixel. When a value associated with the primary reference pixel is larger than the corresponding values associated with all the secondary reference pixels, the condition A1 is established.

At step S23, illustrated in FIG. 12, using the predetermined condition A2, it is identified whether the pixel pattern of the target position is adopted. For example, as shown in FIG. 7, when the pixel G33 is interpolated, the condition A2, true or false, of the comparison equations is checked.

$$(G43>G32) \text{ and } (G43>G34) \text{ and } (G43>G52) \text{ and } (G43>G54) \quad (10)$$

As shown in FIG. 13A, the primary reference pixel positioned at the bottom side of the target position is compared to four secondary reference pixels existing in the vicinity of the primary reference pixel. When a value associated with the primary reference pixel is larger than all the corresponding values associated with the secondary reference pixels, the condition A2 is established.

When both of conditions A1 and A2 are established, step S24 is executed to met the edge detection flag Fv.

Therefore, as shown in FIG. 13A, an edge in the vertical direction is detected for the target position when a value associated with a primary reference pixel located at the top side of the target position is larger than the corresponding values associated with the four secondary reference pixels existing in the vicinity of the primary reference pixel and when a value associated with a primary reference pixel at the bottom side of the target position is larger than the corresponding values associated with the four secondary reference pixels existing in the vicinity of the primary reference pixel.

Further, even when the relative evaluation of values associated with the primary reference pixel and the secondary reference pixels is reversed, the edge detection is possible. It is acceptable to process the data using the conditions B1 and B2 shown in FIG. 7 instead of the conditions A1 and A2.

As shown in FIG. 13B, a value associated with the primary reference pixel positioned at the left side of the target position is compared to corresponding values associated with the four secondary reference pixels existing in the vicinity of the primary reference pixel. When the value associated with the primary reference pixel is larger than the corresponding values associated with all the secondary reference pixels, a condition C1 (equation 11) is established.

$$(G32>G21) \text{ and } (G32>G23) \text{ and } (G32>G41) \text{ and } (G32>G43) \quad (11)$$

Figure 8:
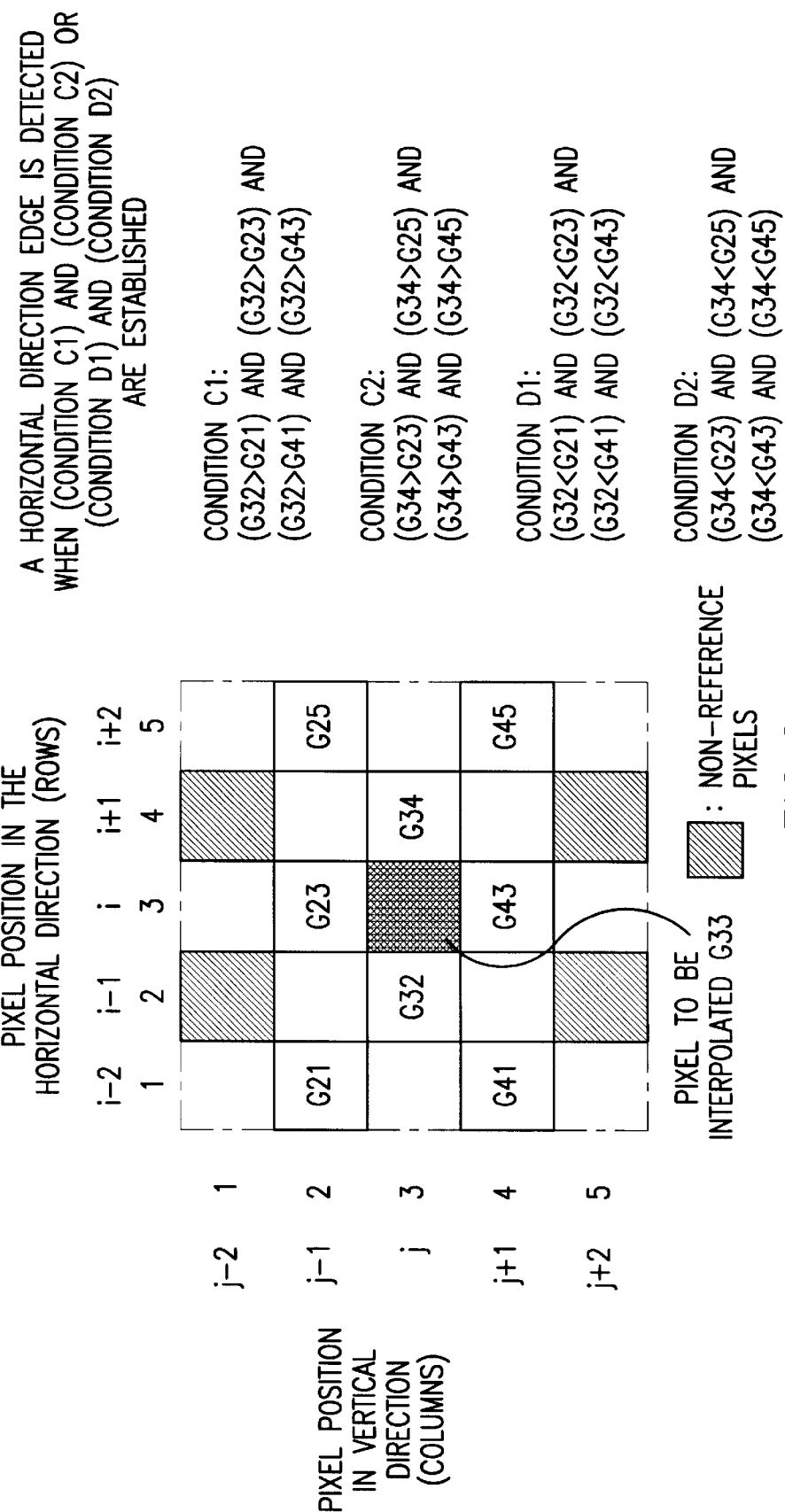
FIG. 8 is a plan view illustrating pixels referenced to detect an edge in a horizontal direction and the detecting conditions.

During step S26, processing determines whether a pixel pattern of the target position can be adopted for a predetermined condition C2. For example, as shown in FIG. 8, when pixel G33 is interpolated, the truth or falsehood of condition C2 (equation (12)) is determined.

$$(G34>G23) \text{ and } (G34>G25) \text{ and } (G34>G43) \text{ and } (G34>G45) \quad (12)$$

As shown in FIG. 13B, the value associated with a primary reference pixel positioned at the right side of the target position is compared to corresponding values associated with four secondary reference pixels existing in the vicinity of the primary reference pixel. The condition C2 is established when the value associated with the primary reference pixel is larger than corresponding values associated with all the secondary reference pixels.

When both conditions C1 and C2 are established, step S27 is executed. At step S27, the edge detection flag Fh is set.

In summary, as shown in FIG. 13B, an edge in the horizontal direction is detected for the target position when a value associated with the primary reference pixel at the left side of the target position is larger than corresponding values associated with the four secondary reference pixels that exist in the vicinity of the primary reference pixel and when a value associated with the primary reference pixel at the right side of the target position is larger than corresponding values associated with the four secondary reference pixels existing in the vicinity of the primary reference pixel.

Further, even when the relative evaluation of values corresponding to the primary reference pixels and the secondary reference pixels is reversed, edge detection is possible. It is acceptable to use conditions D1 and D2 shown in FIG. 8 instead of the conditions C1 and C2.

When interpolation of all the pixels of the G color is completed, control proceeds to step S5 which is shown in FIG. 10. At step S5, the position of the target pixel is decided similarly to step S1. Initially, the target position is located at the left top edge of the image. Subsequently, every time step S5 is executed, the target position is successively updated by shifting in the horizontal direction or the vertical direction by one pixel unit, and proceeds to the position of the right bottom edge of the image, i.e., proceeds to the position of the last pixel.

At step S6, processing checks whether the target position exceeds the most recently interpolated pixel position and whether interpolation processing of all the pixels is completed. If interpolation processing is not completed, control proceeds to step S7. At step S7, processing identifies whether effective pixel data of a color component other than a previously processed color component, for example, the red component, exists at the target position of the image data. When the red color component does not exist, it is necessary to interpolate the red color component, and processing proceeds to step S8. When the red color component exists at a target position, processing proceeds to step S9. At step S9, processing identifies whether effective pixel data of a color component other than the previously processed color components, for example, the blue component, exists at the target position of the image data. When the blue color component does not exist, it is necessary to interpolate the blue color and processing proceeds to step S10. When the blue color component exists at the target position, processing returns to step S5.

At step S8, the interpolation of the red color component is executed. When step S8 is executed, interpolation of all the pixels with respect to the first color component, for example, the green color component, is already completed. Accordingly, the green color pixels at all positions can be used during interpolation of the pixels for the R color.

In this example of the operation of the present invention, a linear interpolation by the chrominance signal, which is a well known technology, is adopted for the R color interpolation. When pixel columns exist as shown in FIG. 9, an interpolated pixel R22 of the red color of the second row, second column, the interpolated pixel R23 of the red color of the second row, third column and the interpolated pixel R32 of the red color of the third row, second column are calculated as follows.

$$R22=((R11-G11))+(R13-G13)+(R31-G31)+(R33-G33))/4+G22$$
$$R23=((R13-G13)+(R33-G33))/2+G23 \; R32=((R31-G31)+(R33-G33))/2+G32 \quad (13)$$

At step S10, the interpolation of the blue color pixels is executed. When this step is executed, the interpolation of all the pixels with respect to the green color has been completed. Accordingly, when the pixels of the blue color are interpolated, the green color pixels of all the positions can be used.

In this example, the linear interpolation by the chrominance signal, which is well known technology, is adopted for the B color interpolation.

For example, when the pixel columns exist, as shown in FIG. 9, the interpolated pixel B23 of the blue color of the second row, third column, the interpolated pixel B32 of the blue color of the third row, second column and the interpolated pixel B33 of the blue color of the third row, third column are calculated as follows.

$$B23=((B22-G22))+(B24-G24))/2+G23 \; B32=((B22-G22))+(B42-G42))/2+G32 \; B33=((B22-G22))+(B24-G24)+(B42-G42)+(B44-G44)/4+G33 \quad (14)$$

Moreover, in this example, the interpolation processing of all the pixels of the green color are completed, after which interpolation of the red color and the blue color are executed. However, it is also acceptable to interpolate the red color and the blue color before interpolating all the pixels of the green color.

When interpolation of the red color and the blue color are performed based on equations (13) and (14), processing during steps S8 and S10 of FIG. 10 can be performed following completion of the green color component interpolation because the pixels adjacent to the target position can be used during interpolation for a 3×3 pixel array that has a center that is the target position of interpolation.

Accordingly, it is preferable to execute interpolation processing of the green color in increments of area formed by 5×5 pixels. Further, it is preferred that interpolation processing of the red and blue color components for the target position is performed after interpolation of the adjacent green color pixels is completed.

A second embodiment according to the present invention differs in the manner of image edge detection.

Various combinations of reference pixels indicate an image edge as shown in FIGS. 14A–14D. A comparison of the primary reference pixels and the secondary reference pixels is executed with any of the patterns shown in FIGS. 14A–14D to indicate a vertical direction edge. A comparison of the primary reference pixels and the secondary reference pixels is executed with any of the patterns shown in FIGS. 14E–14H to indicate a horizontal edge. A value associated with each primary reference pixel is compared with corresponding values of three secondary reference pixels existing in the vicinity of each primary reference pixel. The primary reference pixel is considered an edge candidate if the value associated with the primary reference pixel is larger or smaller than the corresponding values associated with any of three secondary reference pixels. When two primary reference pixels in the vertical direction are edge candidates, a vertical direction edge is indicated. If two primary reference pixels in the horizontal direction are edge candidates, a horizontal direction edge is indicated.

The combination of the reference pixels shown in FIGS. 14A–14H is one example. However, other combinations can be considered. For example, the position of the secondary reference pixels can be shifted to the positions which are symmetrically left and right or to positions which are symmetrically top and bottom. Moreover, the modification as follows can be considered. Each primary reference pixel may be compared to each of the four secondary reference pixels that exist in the vicinity of each primary reference pixel. When any three of the comparison results satisfy the specified condition, the primary reference pixel is considered as an edge candidate.

A third embodiment of the present invention is a modification of the above-mentioned first embodiment. Only the combination of the reference signals when an image edge is detected for the green color component is different from the first embodiment. The combination of the reference pixels when an image edge is detected is shown in FIGS. 15A–15F. When a vertical direction edge is detected, a comparison of the primary reference pixels and the secondary reference pixels is executed with any of the patterns shown in FIGS. 15A–15C. When a horizontal direction edge is detected, a comparison of the primary reference pixels and the secondary reference pixels is executed with any of the patterns shown in FIGS. 15D–15F.

In short, in this embodiment, each primary reference pixel is compared to two secondary reference pixels that exist in the vicinity of each primary reference pixel. The primary reference pixel is considered as an edge candidate when the primary reference pixel has a value associated with it that is larger or smaller than values associated with any two secondary reference pixels.

If both of two primary reference pixels in the vertical direction are edge candidates, a vertical direction edge is detected. Moreover, if both of two primary reference pixels in the horizontal direction are edge candidates, a horizontal direction edge is detected. The combination of the reference pixels shown in FIGS. 15A–15F is one example. However, other combinations can be considered. For example, the position of the secondary reference pixels can be shifted to the positions which are symmetrically left and right or to positions which are symmetrically top and bottom.

Figure 16:
FIG. 16 is a plan view illustrating the pixel arrangement of a two-dimensional image processed according to a fourth embodiment.

A fourth embodiment of the present invention is a modification of the above-mentioned first embodiment. The color components of the pixels which form the image to be processed is different from the first embodiment. FIG. 16 shows an example of the pixel array which composes an image to be processed. In this example, the image is composed by the R(red) color, the B(blue) color and the W color. The W color includes all the wavelength components of the R(red) color, the G(green) color and the B(blue) color.

This is the same as the first embodiment except that the green color in the first embodiment is switched to the W color. In order to obtain the image in FIG. 16, very small areas 2G of the filter 2 are changed to transmit all the wavelength components of the R color, the G color and the B color. In the interpolating processing executed by the image processor 8, the G color component pixel is switched to the W color pixel.

In the first embodiment, the interpolated pixels are formed by the software processing of the computer. However, this processing can be replaced with exclusive hardware. For example, when four digital comparators are provided and the comparisons of the primary reference pixels and the secondary reference pixels are performed, four comparison operations concerning the condition A1 (or A2, C1 or C2) can be realized simultaneously.

If the image processing program of the present invention is saved in an exchangeable recording medium such as a disk, the present invention can be implemented with a processing device which has flexibility, such as personal computer, by reading-in this recording medium. A CD-ROM is only one type of recording medium upon which the interpolation process can be recorded. The recording medium can be readily removable, such as, for example, a CD-ROM, or relatively fixed, such as, for example, an internal ROM, RAM or hard drive. Another type of recording medium is, for example, a transient recording medium such as, for example, a carrier wave. By transmitting the interpolation program as a computer data signal embodied in a carrier wave (carrier wave type or recording medium), the interpolation program can be transmitted to, for example, the personal computer via a communications network such as, for example, the World Wide Web.

The present invention executes suitable interpolation for the pixels of the first color component, which have a large pixel ratio in the two-dimensional pixel array, i.e., the pixels of the luminance component. Therefore, the present invention is very effective at improving the resolution of the image.

In particular, in the present invention, since the existence or non existence of an image edge component may be detected by a simple comparison between pixels, the processing is very easy, and the time required for forming the interpolated pixels is short. Moreover, since the interpolated pixels of the first color component are formed based on reference pixels of the first color component, even when shifting occurs between the position at which the luminance changes and the position at which the hue is changed, interpolated pixels which are more indicative of the original image can be formed.

In one aspect of the present invention, when an edge in the vertical direction is detected, the influence of the reference pixels at the left and right of the target position is reduced and the influence of the reference pixels at the top and bottom of the target position is increased. Therefore, the resolution in the horizontal direction is improved. Moreover, when an edge in the horizontal direction is detected, the influence of the reference pixels at the top and bottom of the target position is reduced and the influence of the reference pixels at the left and right of the target position is increased. Accordingly, the resolution in the vertical direction is improved.

The brightness of the interpolated pixel is adequately controlled by normalizing so that the total sum of the weighting coefficient with respect to the reference pixels becomes one.

In another aspect of the present invention, when an edge in the vertical direction is detected, there is no influence of the reference pixels at the left and right of the target position, and the interpolated pixel is formed only based on the reference pixels at the top and bottom of the target position. When an edge in the horizontal direction is detected, there is no influence of the reference pixels at the top and bottom of the target position, and the interpolated pixel is formed only by the reference pixels at the left and right of the pixel. Accordingly, the resolution in the vertical direction is improved.

As a result of these improvements, existence or non existence of an image edge component can be detected more accurately.

The image processing device of the present invention is very effective at improving image resolution since the interpolation controller executes a suitable interpolation of the pixels of the first color component having a large pixel ratio in the two-dimensional pixel array, i.e., the pixels of the luminance component. In particular, in the present invention, since the existence or non existence of the image edge component is detected by simple pixel comparison, the processing is very easy, and the time required to form the interpolated pixel is short. Moreover, since the interpolated pixel of the first color component is formed based on reference pixels of the first color component, even when the shifting occurs between the position at which the luminance changes and the position at which the hue is changed, an interpolated pixel which is more indicative of the original image can be formed.

In the illustrated embodiments, the controller (image processor 8) is implemented using a suitably programmed general purpose computer, e.g., a microprocessor, microcontroller or other processor device (CPU or MPU). It will be appreciated by those skilled in the art, that the controller can also be implemented as a single special purpose integrated circuit (e.g., ASIC) having a main or central processor section for overall, system-level control, and separate sections dedicated to performing various different specific computations, functions and other processes under control of the central processor section. The controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer in conjunction with one or more peripheral (e.g., integrated circuit) data and signal processing devices. In general, any derive or assembly of devices on which a finite state machine capable of implementing the flow charts shown in FIGS. 10–12 can be used as the controller.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less, or only a single element, are also within the spirit and scope of the invention.

What is claimed is:

1. An image processing method of performing an image processing on an image having a plurality of pixels, the method comprising the steps of:

comparing the value of one of primary reference pixels of a color component located adjacent to a target position at the top and bottom of the target position or at the left and right of the target position to individual values respectively of secondary reference pixels of the color component existing in the vicinity of the primary reference pixel;

determining whether an image edge component exists based on comparison of the value of the one of the primary reference pixels and the individual values of the secondary reference pixels; and when the image edge component is determined to exist, performing a predetermined image processing on the image in consideration of the existing edge component.

2. An image processing apparatus that performs an image processing on an image having a plurality of pixels, the apparatus comprising:

means for comparing the value of one of primary reference pixels of a color component located at positions adjacent to a target position at the top and bottom of the target position or at the left and right of the target position to individual values respectively of secondary reference pixels of the color component located in the vicinity of the primary reference pixel;

means for identifying the existence or non-existence of an image edge component based on an output of the means for comparing; and means for performing a predetermined image processing on the image in consideration of the existence of the image edge component, when the image edge component is detected.

3. The image processing apparatus of claim 2, wherein:

the image has the color component being present at every other pixel position in vertical and horizontal directions in the image;

the target position does not include the color component; and the predetermined image processing is performed by interpolating a value of the color component at the target position based on values associated with reference pixels of the color component located at the top, bottom, left and right of the target position.

4. A recording medium in which is recorded a computer readable image processing program for use by a computer in performing an image processing on an image having a plurality of pixels, the program comprising:

a comparison procedure that compares the value of one of primary reference pixels of a color component located adjacent to a target position at the top and bottom of the target position or at the left and right of the target position with individual values respectively of secondary reference pixels of the color component located in the vicinity of the primary reference pixel;

a determination procedure that determines whether an image edge component exists based on comparison of the value of the one of the primary reference pixels and the individual values of the secondary reference pixels; and an image processing procedure that, when the image edge component is determined to exist, performs a predetermined image processing on the image in consideration of the existing image edge component.

5. The recording medium of claim 4, wherein:

the image has the color component being present at every other pixel position in vertical and horizontal directions in the image;

the target position does not include the color component; and the predetermined image processing is performed by interpolating a value of the color component for the target pixel based on values associated with reference pixels of the color component positioned at the top, bottom, left and right of the target position.

6. An image processing apparatus that performs an image processing on an image having a plurality of pixels, the apparatus comprising:

a comparator that compares the value of one of primary reference pixels of a color component located at positions adjacent to the target position at the top and bottom of the target position or at the left and right of the target position to individual values respectively of secondary reference pixels of the color component located in the vicinity of the primary reference pixel;

an image edge component detector that determines whether an image edge component exists based on output of the comparator; and an image processor that, when the image edge component is detected, performs a predetermined image processing on the image in consideration of the existing image edge component.

7. The image processing apparatus of claim 6, wherein:

the image has the color component being present at every other pixel position in vertical and horizontal directions in the image;

the target position does not include the color component; and the predetermined image processing is performed by interpolating a value of the color component for the target pixel based on values associated with reference pixels of the color component positioned at the top, bottom, left and right of the target position.

8. The image processing method of claim 1, wherein:

the image has the color component being present at every other pixel position in vertical and horizontal directions in the image;

the target position does not include the color component; and the predetermined image processing is performed by interpolating a value of the color component for the pixel at the target position based on values associated with reference pixels of the color component positioned at the top, bottom, left and right of the target position.

9. The image processing method of claim 8, wherein the predetermined image processing is performed by interpolating the value of the color component for the pixel at the target position based on values associated with a plurality of the reference pixels positioned on a detected edge.

10. The image processing method of claim 8, wherein:

the predetermined image processing is performed by interpolating a value of the color component for the pixel at the target position based on values associated with reference pixels of the color component positioned at the top, bottom, left and right of the target position, a first weighting coefficient corresponding to the reference pixels at the top and bottom of the target position and a second weighting coefficient corresponding to reference pixels at the left and right of the target position; and the first and second weighting coefficients are set to mutually different values.

11. The image processing method of claim 10, wherein one of the first and second weighting coefficients for the reference pixels that are not located on a detected edge is set to zero.

12. The image processing method of claim 10, wherein the color component is a luminance color component.

13. The image processing method of claim 10, wherein one of the first and second weighting coefficients corresponding to the reference pixels in the vicinity of the target position near a detected edge is set larger than the other one of the first and second weighting coefficients.

14. The image processing method of claim 10, wherein the total sum of the first and second weighting coefficients is normalized.

* * * * *